United States Patent
Menard et al.

(10) Patent No.: US 10,230,132 B2
(45) Date of Patent: Mar. 12, 2019

(54) SECONDARY CELL WITH HIGH RECHARGING EFFICIENCY AND LONG TERM STABILITY

(71) Applicant: Urban Electric Power Inc, Pearl River, NY (US)

(72) Inventors: Melissa Menard, Pearl River, NY (US); David Kaplin, Pearl River, NY (US); Ryan Cammarata, Pearl River, NY (US)

(73) Assignee: Urban Electric Power Inc, Pearl River, NY (US)

( * ) Notice: Subject to any disclaimer, the term of this patent is extended or adjusted under 35 U.S.C. 154(b) by 0 days.

(21) Appl. No.: 15/639,689

(22) Filed: Jun. 30, 2017

(65) Prior Publication Data

US 2017/0301960 A1    Oct. 19, 2017

Related U.S. Application Data (63) Continuation of application No. PCT/US2017/022044, filed on Mar. 13, 2017.

(Continued)

(51) Int. Cl.

| H01M 10/26 | (2006.01) |
| H01M 10/04 | (2006.01) |
| H01M 4/50 | (2010.01) |
| H01M 4/42 | (2006.01) |
| H01M 4/62 | (2006.01) |

(Continued)

(52) U.S. Cl.
CPC ......... *H01M 10/26* (2013.01); *H01M 2/0217* (2013.01); *H01M 4/244* (2013.01); *H01M 4/42* (2013.01); *H01M 4/50* (2013.01); *H01M 4/62* (2013.01); *H01M 4/622* (2013.01); *H01M 4/623* (2013.01); *H01M 4/625* (2013.01); *H01M 4/74* (2013.01); *H01M 10/0431* (2013.01); *H01M 10/24* (2013.01); *H01M 10/28* (2013.01);

(Continued)

(58) Field of Classification Search
CPC .. H01M 10/26; H01M 10/0431; H01M 4/625; H01M 4/42; H01M 4/50; H01M 2300/0014
See application file for complete search history.

(56) References Cited

U.S. PATENT DOCUMENTS

| 4,957,827 A | 9/1990 | Kordesch et al. |
| 5,424,145 A | 6/1995 | Tomantschger et al. |

(Continued)

FOREIGN PATENT DOCUMENTS

| EP | 0964467 A2 | 12/1999 | |
| JP | 2003-303624 | * 10/2003 | ............ H01M 10/40 |

OTHER PUBLICATIONS

Filing Receipt and Specification of U.S. Appl. No. 62/307,649 filed Mar. 14, 2016, 30 pages.

(Continued)

*Primary Examiner* — Osei K Amponsah
(74) *Attorney, Agent, or Firm* — Andrew M. Metrailer; Conley Rose, P.C.

(57) ABSTRACT

A secondary zinc-manganese dioxide secondary cell is disclosed. The cell includes a zinc gel anode, high manganese content cathode in either prismatic or jelly roll form. An aqueous based continuous reel to reel process for formulation and fabrication of the anode and cathode is provided. The cell is contained in a box assembly.

26 Claims, 6 Drawing Sheets

Related U.S. Application Data (60) Provisional application No. 62/307,649, filed on Mar. 14, 2016.

(51) Int. Cl.
| | |
|---|---|
| *H01M 4/74* | (2006.01) |
| *H01M 10/28* | (2006.01) |
| *H01M 2/02* | (2006.01) |
| *H01M 4/24* | (2006.01) |
| *H01M 10/24* | (2006.01) |
| *H01M 4/02* | (2006.01) |

(52) U.S. Cl.
CPC .... *H01M 10/286* (2013.01); *H01M 2004/023* (2013.01); *H01M 2300/0014* (2013.01)

(56) References Cited

U.S. PATENT DOCUMENTS

| | | |
|---|---|---|
| 8,231,988 B2 | 7/2012 | Leddy et al. |
| 2004/0076881 A1* | 4/2004 | Bowden .................. H01M 4/32 429/223 |
| 2006/0172193 A1* | 8/2006 | Iwamoto .................. H01M 2/08 429/185 |
| 2009/0087731 A1* | 4/2009 | Fukui .................... H01M 4/131 429/164 |
| 2012/0121965 A1* | 5/2012 | Makino .................. H01M 2/22 429/156 |
| 2013/0065112 A1* | 3/2013 | Uzuka .................... H01M 4/06 429/169 |
| 2015/0207179 A1* | 7/2015 | Bao .................. H01M 10/0587 429/94 |
| 2015/0311503 A1 | 10/2015 | Ingale et al. |

OTHER PUBLICATIONS

Electronic Acknowledgement Receipt and Specification of International Application No. PCT/US2017/022044 filed Mar. 13, 2017, 36 pages.

Foreign Communication from the priority application—International Search Report and Written Opinion of the International Searching Authority of application No. PCT/US2017/022044 dated Aug. 18, 2017, 13 pages.

* cited by examiner

SECONDARY CELL WITH HIGH RECHARGING EFFICIENCY AND LONG TERM STABILITY

CROSS-REFERENCE TO RELATED APPLICATIONS

This application is a continuation of and claims priority to International Application No. PCT/US2017/022044 filed Mar. 13, 2017, which claims priority to U.S. Provisional Patent Application No. 62/307,649 filed on Mar. 14, 2016, the entirety of which are incorporated herein by reference.

TECHNICAL FIELD

The present disclosure relates to a manganese dioxide cathode-zinc anode cell with high recharging efficiency and long term stability and a process for manufacture thereof. More particularly the present disclosure relates to a cell with a flexible high zinc content electrode, a high manganese dioxide content cathode, and separator.

BACKGROUND

There is a desire to improve the stability of secondary cells to dendrite formation and increase the number of charging cycles a secondary cell can withstand without impaired performance.

SUMMARY

The following presents a simplified summary of the innovation in order to provide a basic understanding of some aspects of the systems and methods described herein. This summary is not an extensive overview. It is intended to neither identify key or critical elements of the systems and/or methods nor delineate the scope of the systems and/or methods. Its sole purpose is to present some concepts in a simplified form as a prelude to the more detailed description that is presented later.

The present disclosure relates to a secondary cell with high recharging efficiency and stability to zinc dendrite formation. The secondary cell can be manufactured in prismatic or jelly roll forms using a continuous reel-to-reel process. In either form the cell possesses a flexible high zinc content electrode, a manganese dioxide cathode with a blended graphite composition and a separator.

The low gassing zinc gel for use in the anode can be generated under aqueous conditions using a mixture of zinc dust, homopolymer binders and other additives to generate a highly flexible zinc anode gel with ≥75% zinc content.

The high content manganese dioxide paste for use in the cathode may be generated by mixing manganese dioxide with particle size of about 45 to about 55 microns with a blend of natural and expanded graphite, a binder and further metal additive. The high content manganese dioxide paste for use in the cathode has a manganese dioxide content of about 75% to about 85% by weight.

Both the zinc anode gel and manganese dioxide paste compositions are applied to prismatic sheets or jelly rolls using a continuous reel-to-reel coating process prior to insertion of a separator and finally into a cell box for construction of the secondary cell.

DETAILED DESCRIPTION

The present systems and methods are best understood by reference to the detailed figure and description set forth herein.

Embodiments are discussed below with reference to the Figures. However, those skilled in the art will readily appreciate that the detailed description given herein with respect to these figures is for explanatory purposes as the systems and methods extend beyond these limited embodiments. For example, it should be appreciated that those skilled in the art will, in light of the teachings of the present description, recognize a multiplicity of alternate and suitable approaches, depending upon the needs of the particular application, to implement the functionality of any given detail described herein, beyond the particular implementation choices in the following embodiments described and shown. That is, there are numerous modifications and variations that are too numerous to be listed but that all fit within the scope of the present description. Also, singular words should be read as plural and vice versa and masculine as feminine and vice versa, where appropriate, and alternative embodiments do not necessarily imply that the two are mutually exclusive.

It is to be further understood that the present description is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present systems and methods. It must be noted that as used herein and in the appended claims (in this application, or any derived applications thereof), the singular forms "a," "an," and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this description belongs. Preferred methods, techniques, devices, and materials are described, although any methods, techniques, devices, or materials similar or equivalent to those described herein may be used in the practice or testing of the present systems and methods. Structures described herein are to be understood also to refer to functional equivalents of such structures. The present systems and methods will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims may be formulated in this Application or of any further Application derived therefrom, to particular combinations of features, it should be understood that the scope of the disclosure also includes any novel feature or any novel combination of features disclosed herein either explicitly or implicitly or any generalization thereof, whether or not it relates to the same systems or methods as presently claimed in any Claim and whether or not it mitigates any or all of the same technical problems as do the present systems and methods.

Features which are described in the context of separate embodiments may also be provided in combination in a single embodiment. Conversely, various features which are, for brevity, described in the context of a single embodiment, may also be provided separately or in any suitable sub-combination. The Applicants hereby give notice that new claims may be formulated to such features and/or combinations of such features during the prosecution of the present Application or of any further Application derived therefrom.

In this disclosure, the terms "negative electrode" and "anode" are both used to mean "negative electrode." Likewise, the terms "positive electrode" and "cathode" are both used to mean "positive electrode." Reference to the term "primary battery" (e.g., "primary battery," "primary electrochemical cell," or "primary cell"), refers to a cell or battery that after a single discharge is disposed of and replaced. Reference to the term "secondary battery" (e.g., "secondary battery," "secondary electrochemical cell," or "secondary cell"), refers to a cell or battery that can be recharged one or more times and reused.

In an embodiment, a high manganese content cathode paste, process for manufacture thereof, and an aqueous continuous process for application to a prismatic sheet or jelly roll is provided. While described in some embodiments as being directed to a secondary cell, the various embodiments herein can also be used for primary or single use cells or batteries.

In an embodiment, a high conductivity, rechargeable manganese dioxide cathode paste can comprise manganese dioxide, a blend of carbon additives such as graphite and other carbon based conductive additives, and the incorporation of low resistance binders to support large surface area cathodes for secondary batteries.

The manganese dioxide can be based on one or many polymorphs of $MnO_2$, including electrolytic (EMD), chemically modified manganese oxide (CMD), $\alpha$-$MnO_2$, $\beta$-$MnO_2$, $\gamma$-$MnO_2$, bernessite ($\delta$)-$MnO_2$, $\epsilon$-$MnO_2$, or $\lambda$-$MnO_2$. Discharging $MnO_2$ completely can eventually lead to the formation of the birnessite-type $MnO_2$, which exhibits a layered structure. The manganese dioxide particle size of the paste can range from about 30 to about 70 microns, from about 40 to about 60 microns, or about 45 to about 55 microns. The mass percentage of manganese dioxide in the cathode paste can range from about 70% to about 90%, or from about 75% to about 85%.

The manganese dioxide can be mixed with a dual carbon blend and binder prior to coating on the prismatic cell or jelly roll. The dual carbon blend may be formed from graphite and a conductive additive. The conductive additive can include, but is not limited to, expanded graphite, non-expanded graphite, carbon black, or carbon nanotubes (e.g., single walled carbon nanotubes, multiwalled carbon nanotubes), graphene, or any combination thereof. Other examples of a conductive additive can include TIMREX Primary Synthetic Graphite (all types), TIMREX Natural Flake Graphite (all types), TIMREX MB, MK, MX, KC, B, LB, ENASCO 150G, 210G, 250G, 260G, 350G, 150P, 250P; SUPER P, SUPER P Li, acetylene black, or any combinations thereof. In an embodiment, the carbon blend can comprise non-expanded graphite and expanded graphite. In some embodiments, the carbon blend can comprise non-expanded graphite, expanded graphite, and carbon nanotubes, alone or in combination with any additional conductive additive(s).

The conductive additive can has a particle size range from about 1 to about 50 microns, or between about 2 and about 30 microns, or between about 5 and about 15 microns. In an embodiment, the conductive additive can include expanded graphite having a particle size range from about 10 to about 50 microns, or from about 20 to about 30 microns. In some embodiments, the mass ratio of graphite to the conductive additive can range from about 5:1 to about 50:1, or from about 7:1 to about 28:1. The total carbon mass percentage in the cathode paste can range from about 5% to about 30% or between about 10% to about 20%.

The carbon blend can be mixed prior to being combined with the other ingredients in the cathode paste. For example, the components of the carbon blend can be mixed and then added into the cathode paste mixture, as described in more detail hinere. The mixing of the carbon blend can be assessed as being complete when the electrical conductivity and the tap density of the mix reaches the values consistent with the carbon ratio.

The cathode paste can also comprise a binder. In an embodiment, the binder comprises a water-soluble cellulose-based hydrogel, which are used as thickeners and strong binders, and are cross-linked with good mechanical strength with conductive polymers. The binder may also be a cellulose film sold as cellophane. In some embodiments, the cellulose-based hydrogel can be a water-based cellulose that is water soluble and biocompatible and can be used as a thickener, a binding agent, a lubricant, an emulsifier, a stabilizer and a suspension aid. Suitable binders for the cathode paste may include one or more of the group selected from Teflon®, polyethylene, carboxymethyl cellulose, methyl cellulose (MC), hydroypropyl cellulose (HPH), hydroypropylmethyl cellulose (HPMC), hydroxethylmethyl cellulose (HEMC), carboxymethylhydroxyethyl cellulose and hydroxyethyl cellulose (HEC), polyvinyl alcohol, latex, and any combination thereof.

The binder content of the manganese dioxide paste can range from about 0.1% to about 10% by weight, or between about 4% to about 7% by weight.

Cathode additives which enhance cycle performance may be included in the manganese dioxide paste. Suitable cathode additives include one or more of MgO, $BaTiO_3$, $CaTiO_3$, BaOH, $Bi_2O_3$, $TiO_2$, and $TiB_2$. In order to both support long cycle life without causing irreversible cathode degradation the total weight of additive is approximately 1% by weight of the manganese dioxide paste.

In some embodiments, the cathode paste can comprise one or more conductive metal additives. The addition of conductive metal additives to the mixed material cathode may be accomplished by the addition of metal powder to the cathode material mixture. The conductive metal additive can be present in a concentration of about 0.01 wt. % to about 30 wt. % of the cathode material. The conductive metal additive may be, for example, nickel, copper, silver, gold, tin, cobalt, antimony, bismuth, brass, bronze, aluminum, calcium, iron, platinum, or any combination thereof. In some embodiments, the conductive metal additive can be in the form of a powder, a metal layer, or metal particles.

The manganese dioxide paste formed using the methods described herein can be a self-supporting paste. In some embodiments, the paste can be formed by dispersing the conductive additive in bulk graphite powder, at the desired ratio, prior to blending with manganese dioxide. This process may result in better mixing of the carbon blend to result in a more consistent final cathode paste mixture.

The carbon blend (e.g., the conductive additives, non-expanded graphite, expanded graphite, carbon nanotubes, etc.) have anisotropic particle shapes that result in enhanced conductivity along the face of the resulting cathode. In sufficiently high concentrations, the components of the carbon blend (e.g., the conductive additives, expanded graphite carbon nanotubes, etc.) can pack consistently in the direction normal to the graphitic sheet. The choice of conductive additives, such as non-expanded and/or expanded graphite, carbon nanotubes, and the like, can provide increased conductivity in the plane of the large paste sheet resulting in cathodes of at least ten times the surface area as compared to standard primary and secondary alkaline cathodes.

The manganese dioxide cathode paste can have porosities in the range of between about 25% to about 35%, which can be achieved by controlling the paste densities to a range of between about 1.5 and about 2.5 g/cm$^3$.

As a result of the mixing process the manganese dioxide paste cohesion is can be sufficiently high to yield a free-standing, continuous sheet or slug of paste and does not require a mechanical support to maintain cohesion. While a mechanical support may not be needed, one may still be present in the form of a mesh, sheet, or foil, and a current collector can still be present even if not functioning as a mechanical support.

The resulting cathode paste formulation lends itself to varied electrode geometries, including jellyroll, cylindrical bobbin, and prismatic. A jellyroll configuration includes a planar cathode and anode separated by a separator and rolled into a cylindrical configuration. A prismatic configuration can include both individual layers of one or more cathodes and one or more alternating anodes as well as a planar cathode and anode folded into a zig-zag configuration to provide a final prismatic form factor.

The cathode paste described herein can provide a higher electrical conductivity, paste porosity, and a stable matrix leading to both long cycle life, of between about 300 and about 1000 cycles, and higher surface area when compared to commercially available alkaline cathodes.

When used in the cells described herein (e.g., primary cells and/or secondary cells), the higher porosity and electrical conductivity of the cathode paste supports battery life and volumetric energy densities comparable to lead acid batteries (40 Wh/L per cycle, 300-1000 cycles) without the environmental concerns.

The cathode pastes described herein possess higher surface area which enables the generation of very large cathodes (100 to 1300 sq. cm.) and various form factors in both primary and secondary batteries.

The cathode paste can be formed on a current collector formed from a conductive material that serves as an electrical connection between the cathode material and an external electrical connections. In some embodiments, the cathode current collector can be, for example, nickel, steel, nickel-coated steel, nickel plated copper, tin-coated steel, copper plated nickel mesh, copper plated nickel foil, nickel plated copper mesh, nickel plated copper foil, silver coated copper mesh, silver coated copper foil, copper, magnesium, aluminum, tin, iron or a mesh with half nickel and half copper, or similar material. The cathode current collector may be formed into an expanded mesh, perforated metal, foam, foil, perforated foil, wire screen, or a wrapped assembly. In some embodiments, the current collector can be formed into or form a part of a pocket assembly. A tab can be coupled to the current collector to provide an electrical connection between an external source and the current collector.

Also disclosed herein is a low gassing zinc gel, a process for manufacture thereof, and an aqueous continuous process for application to a prismatic sheet or jelly roll.

A zinc gel for use in the anode can have a zinc content of about 75% or greater based on weight, about 10% to about 40%, or alternatively about 10% to about 20% water content, and further optional binders and additives. The zinc can be present as elemental zinc and/or as zinc oxide (ZnO). As will be appreciated by one of skill in the art, and with the help of this disclosure, the purpose of the ZnO in the non-flow cell Zn anode mixture is to provide a source of Zn during the recharging steps, and the zinc present can be converted between zinc and zinc oxide during charging and discharging phases.

Generally, a binder functions to hold the electroactive material particles (e.g., Zn used in anode, etc.) together and in contact with the anode current collector. Suitable binders for the zinc anode gel can comprise homopolymer binders, such as polytetrafluoroethene, carboxymethyl cellulose, polyvinylalcohol, Carbapol®, polyethylene glycol, or other homopolymers and combinations thereof Other suitable binders for the zinc anode gel can include, but are not limited to, a copolymer of tetrafluoroethylene and propylene; polyvinylidene fluoride (PVDF), a copolymer of styrene and butadiene, styrene-butadiene rubber (SBR); a conducting polymer, polyaniline, polypyrrole, poly(3,4-ethylenedioxylthiophene) (PEDOT), copolymers of 3,4-ethylenedioxylthiophene with various co-monomers (e.g., PEDOT with various dopants), a copolymer of 3,4-ethylenedioxylthiophene and styrenesulfonate (PEDOT:PSS), polyvinyl alcohol (PVA), hydroxymethyl cellulose (HMC), carboxymethyl cellulose (CMC), and the like, or combinations thereof.

Suitable additives include but not are limited to which include zinc oxide, carbon powder, indium compounds, bismuth compounds, lithiated and fibrous compounds. Additional suitable additives can include electrically conductive materials graphite, graphite powder, graphite powder flakes, graphite powder spheroids, carbon black, activated carbon, conductive carbon, amorphous carbon, glassy carbon, and the like, or combinations thereof. The conductive material can also comprise any of the conductive carbon materials described with respect to the carbon blend in the cathode paste including, but not limited to, acetylene black, single walled carbon nanotubes, multi-walled carbon nanotubes, graphene, or any combinations thereof.

Once formed, the zinc anode gel can be coupled to an anode current collector. The anode current collector can include any of the current collectors described with respect to the cathode current collector. In general, the current collector acts as an electron carrier and a surface upon which zinc can be deposited during charging of the battery. In some embodiments, the current collector comprises a porous metal collector further comprising a variety of collector configurations, such as for example a metal conductive mesh, a metal conductive interwoven mesh, a metal conductive expanded mesh, a metal conductive screen, a metal conductive plate, a metal conductive foil, a metal conductive perforated plate, a metal conductive perforated foil, a metal conductive perforated sheet, a sintered porous metal conductive sheet, a sintered metal conductive foam, an expanded conductive metal, a perforated conductive metal, and the like, or combinations thereof. The anode current collector can comprise silver, bismuth, copper, cadmium, lead, iron, nickel, indium, tin, or any combinations of these metals. A tab can be coupled to the current collector to provide an electrical connection between an external source and the current collector.

The process for mixing of the zinc dust, the binder, and other additives is performed under aqueous conditions without the requirement of organic solvents. The avoidance of organic solvents in this step results in a more environmentally friendly, lower toxicity and safer to operate process. Gassing during formation of the zinc gel, due to oxidation of ZnO dust in the presence of water, is reduced by controlled mixing.

The zinc anode gel can be used as manufactured in a cell or it may alternatively be formed into shapes such as long electrode sheets with the current collector embedded in the matrix and/or with the zinc gel disposed on a surface of the current collector.

The gel zinc anode has flow characteristics such that it can penetrate porous current collectors, such as a screen, wire mesh or foam metal. Furthermore it is observed that in the event the anode gel is dried, within 5 mins exposure to water the gel can fully wet out within approximately 5 minutes to be restored to a gel like state.

In another aspect, a continuous process is provided for the manufacture of prismatic sheets or jelly rolls using the zinc anode gel described herein. This process is described with reference to FIG. 1. In another aspect, a continuous process is provided for the manufacture of prismatic sheets or jelly roll using the manganese dioxide paste described herein. This process is described with reference to FIG. 2.

Figure 1:
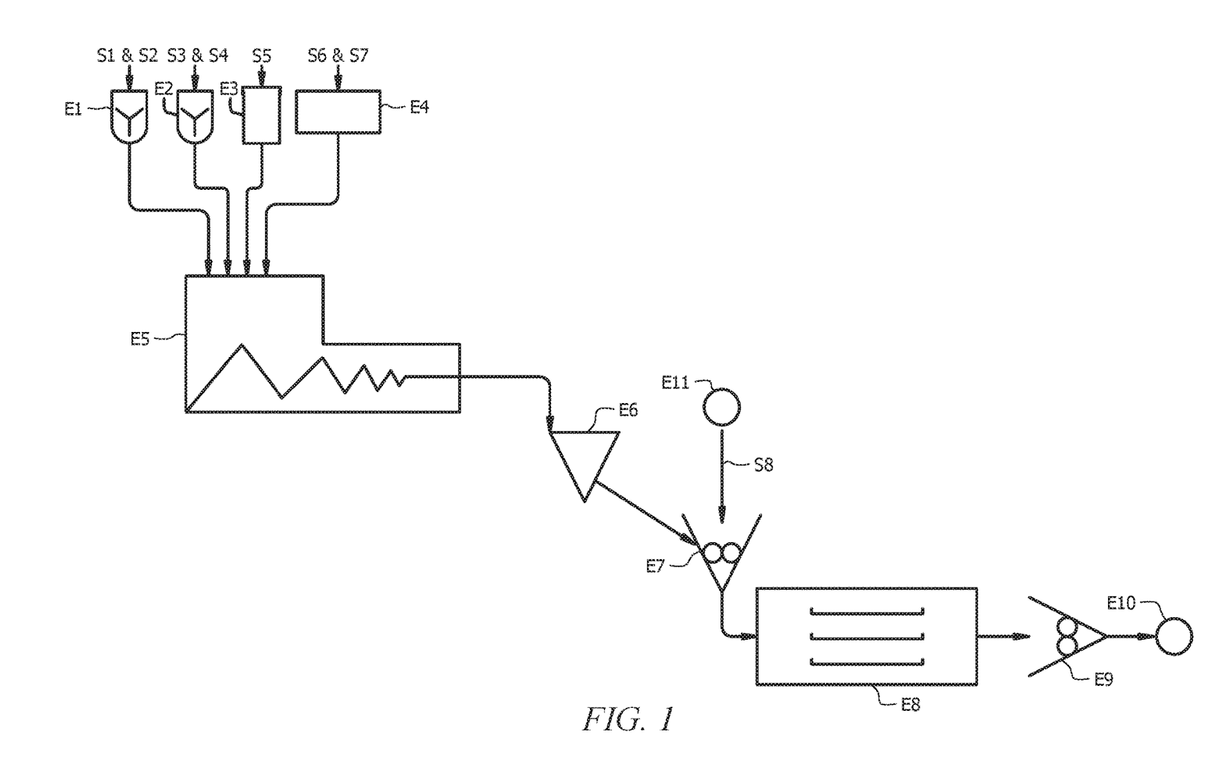
FIG. 1 is a flow diagram of the continuous reel to reel aqueous process for manufacture of the zinc anode gel in the prismatic or jelly roll embodiment of the secondary cell according to an embodiment.

Referring to FIG. 1, the zinc gel mixing process can be performed in various vessels labelled E1 to E4. It is contemplated that additional vessels may be added to the configuration as required depending on the final composition required. Each vessel E1-E4 can comprise one or more component of the zinc gel mixture. The components can be transferred from the vessels E1-E4 into the vessel E5 in the desired quantity and relative mixture ratios.

The gel can be mixed in vessel E5, with further processing taking place in the granulator E6 prior to the reel-to-reel coating in vessels E9-E11.

A list of inlet streams, S1 to S7 and vessels or equipment, E1-E9 are provided below with reference to FIG. 1.
E1/E2 liquid mixer
E3 PTFE (or other binder or binder mixture) dispersion tank
E4 solids blender
E5 paste mixer
E6 paste granulator
E7 continuous paste coater
E8 drying oven
E9 calendar press
S1 water
S2 binders and additives
S3 water
S4 binders and additives
S5 PTFE dispersion
S6 zinc
S7 gassing inhibitors and additives
S8 current collector The above lists is not intended to be construed as a defining list but as an example of suitable components and vessels for manufacture of the anode or cathode in jelly roll or prismatic format.

As shown in FIG. 1, the vessels E1, E2 can comprise liquid mixers for providing the liquid components of the gel mixture. For example, water, binders and/or additives can be mixed and combined in the first vessel E1, and additional water, binders, and/or additives can also be combined in vessel E2. The binder can be provided in vessel E3 as a solid or as a dispersion. The dried zinc, gassing inhibitors, and/or additives can be added to vessel E4 and mixed. The components can be combined in the vessel E5 and mixed before passing to the paste granulator E6. The granulated paste can then pass to the continuous paste coater E7, wherein the current collector can be passed through to coat the current collector with the zinc gel. The zinc gel can be dried on the current collector in the drying oven E8 before passing the zinc anode with the zinc on the current collector through the calendar press E9 to provide a consistent thickness of the anode. The resulting anode can then be stored for use with the cathode.

Figure 2:
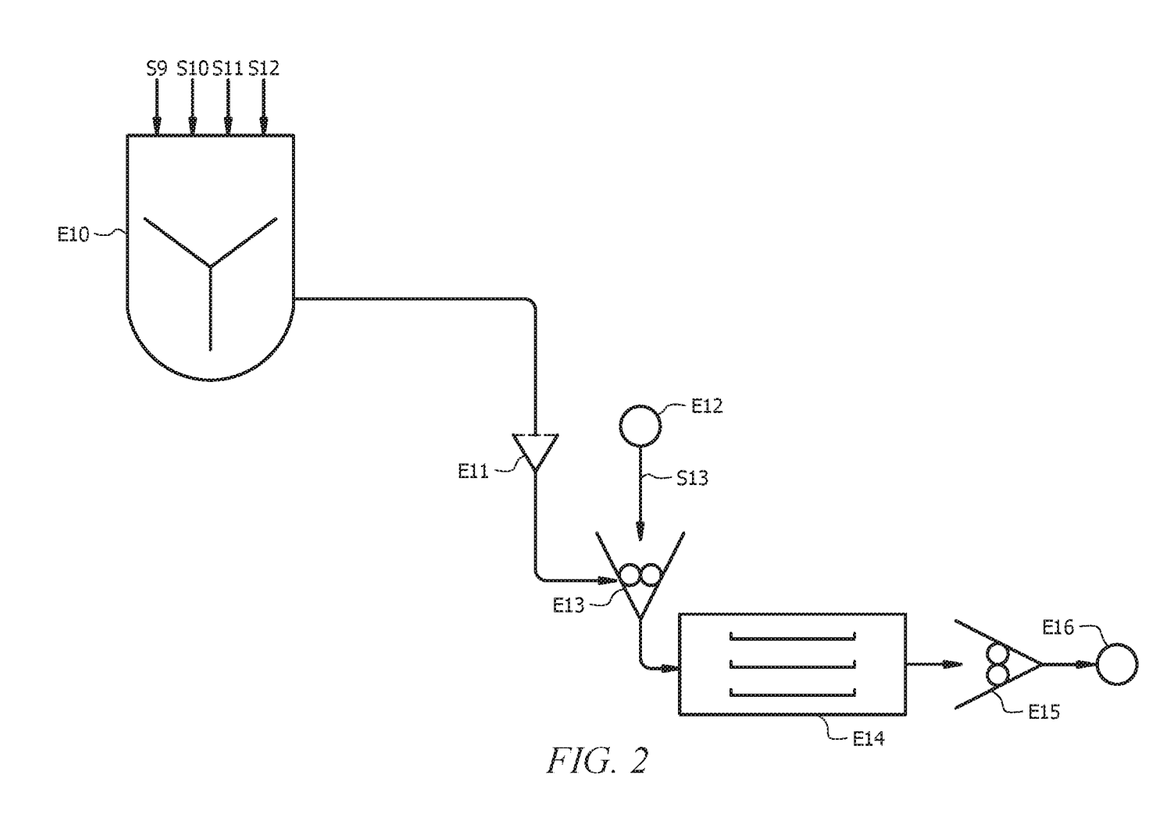
FIG. 2 is a flow diagram of the continuous reel to reel aqueous process for manufacture of the manganese dioxide cathode paste in the prismatic or jelly roll embodiment of the secondary cell.

With reference to FIG. 2. A list of inlet streams, S9 to S13 and vessels or equipment, E10 to E15 are provided below.
S9 active material
S10 water
S11 binders
S12 additives
S13 paste substrate
E10 paste mixer
E11 paste granulator
E12 paste substrate unwinder
E13 paste/gel coater
E14 drying oven
E15 calendar press
E16 take-up reel As shown in FIG. 2, the components of the cathode paste including the manganese oxide, the water, the binders, and the carbon blend can be combined in the mixing vessel E10. The mixture can then pass to the paste granulator E11 the granulated paste passes to the continuous paste/gel coater E13. The current collector can be unrolled from the roll E12 and passed through the paste/gel coater E13 to coat the current collector with the cathode paste. The cathode paste can be dried on the current collector in the drying oven E14 before passing the cathode with the cathode paste on the current collector through the calendar press E15 to provide a consistent thickness of the anode. The resulting anode can then be stored for use on the take-up reel.

In some embodiments, an alkaline cell (e.g., a secondary alkaline cell and/or a primary alkaline cell) design uses long planar manganese dioxide cathode and zinc gel anode electrodes that are wound together with a selected separator interleafed between the anode and the cathode to form one cell.

A separator can be used to form an electrically insulating barrier between the anode and the cathode while being porous to allow for ionic flow in the electrolyte between the electrodes. By being placed between the electrodes, the separator serves to prevent shorting that could occur due to direct electrical contact between the electrodes as well as helping to reduce the likelihood of a zinc dentrite from forming an electrically conductive bridge between the anode and the cathode. As will be appreciated by one of skill in the art, the separator allows the electrolyte, or at least a portion and/or component thereof, to pass (e.g., cross, traverse, etc.) through the electrode separator membrane, to balance ionic flow and sustain the flow of electrons in the battery. In this regard, the separator serves to demarcates the cathode from the anode.

In some embodiments, suitable separators possess 1 to 4 layers of cellulose-based sheet, polyethylene-based sheet, polyvinyl alcohol-based sheet, polyvinyl chloride-based sheet, or nonwoven polypropylene sheets, or any combination of these.

In some embodiments, the secondary cell can include a cell stack arrangement with respect to the separators. The separator placement is selected to isolate the cathode sheet from zinc dendrites, especially at the edges and bottom of the cell. There are multiple options to accomplish this without the added process of forming a heated seal around the edges and bottom of the cathode.

To isolate the cathode edges (the leading and trailing edges that run along the vertical direction with respect to the cell), about 2 to about 5 inches of separator start and end the jelly roll. Therefore, the beginning and ending of the jellyroll consist of separators only with the cathode and anode entering (and leaving) the wind at about 2 to about 5 inches. The tortuous path provided by the excess separator can be used to prevent zinc dendrites from reaching the cathode edges and thereby shorting the cell.

The separator, though not limited to, can be of one or more plies of a single film material or composite film or layers of different films or papers, such as one to three layers of one film and one layer of another film. The different layers and films may, though not limited to, serve different purposes, such as inhibit zinc dendrite shorting between anode and cathode, acting as a chelating agent for the zincate ion in the electrolyte, and serve has an electrolyte soak-up reservoir. The separator can be bonded, by pressure, glue or heat, to the individual electrodes, wrapped around the individual electrodes or wrapped or wound as a loose film with the electrodes. Irrespective of the method, not excluding methods not mentioned, the separator prevents physical contact between the anode and cathode while inhibiting a path for zinc dendrites to form a short between the anode and cathode.

The separator for the prismatic cell or jelly roll embodiments of the cell can be, but is not limited to, cellophane, such as Inovia Films P00 grade cellophane, hydrophilic polypropylene microporous separator, such as Celgard 3501 and Celgard 5500, anion exchange separator, such as FumaTech FumaSep FAA, a composite film, such as a polyvinyl alcohol film laminated to cellophane film, ionically conductive composite film that consists of an alkaline stable inorganic particle disperses in a polymeric matric, such as but limited to polyethylene and synthetic rubber, and nonwoven paper, such papers but not limited to papers manufactured by Freudenberg and Nippon Kodoshi Corporation (NKK), where the nonwoven paper can be, though not limited to, polyacrylic acid grafted polypropylene, polyaramic, vinylon and cellulosic.

Figure 3:
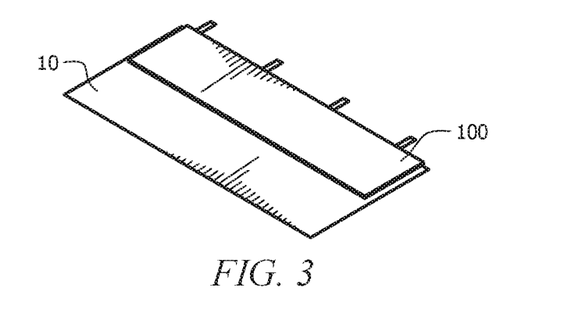
FIG. 3 discloses an embodiment of the separator structure used in the secondary cell.

To isolate the bottom of the cathode (the portion of the cathode which makes contact with the bottom of the cell) there are contemplated a number of orientations of the separators 100 to achieve this:

With reference to FIG. 3, in one embodiment the cathode 10 is placed in a "U" shaped fold of the separators 100. At least 1 layer of separator must form the "U" shape. The remaining layers of separator may be in sheets. In a further embodiment, the anode is placed in a "U" shaped fold of the separators. At least 1 layer of separator must form the "U" shape. The remaining layers of separator may be in sheets. The current collector tab or tabs can extend through the separator 100 or can extent around the separator.

Figure 4:
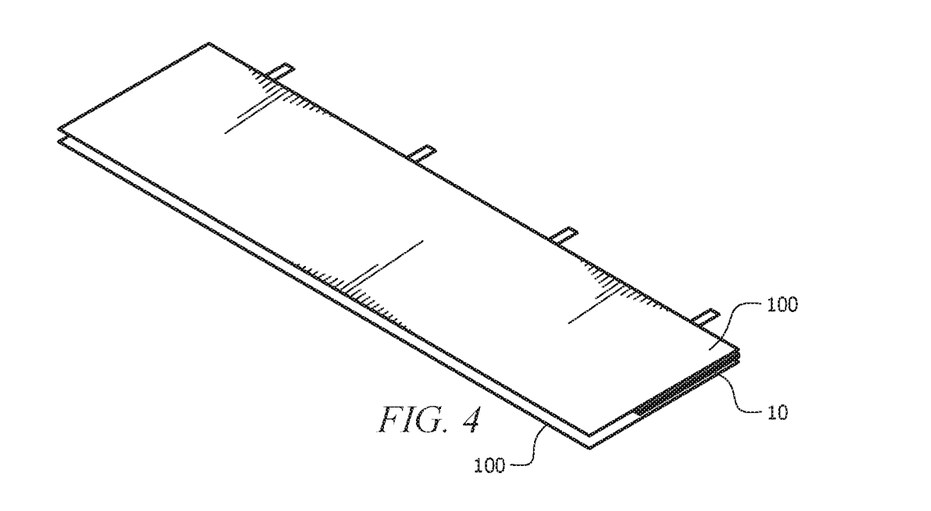
FIG. 4 discloses another embodiment of the separator structure used in the secondary cell.

With reference to FIG. 4 in an embodiment, the separators 100 are oversized with respect to the length of the cell stack. Separator sheets are stacked in sandwich arrangement with the cathode 10 in the middle. The excess separator is folded upwards and taped to isolate the bottom of the cathode from zinc dendrites. This configuration may not require that the separator be heat sealed while still isolating the cathode from the anode through a lengthy pathway. The anode sheet can then be placed on the top. And the separator-cathode-separator-anode stack is wound around a mandrel to form the jellyroll. When rolled, the anode is then in contact with the separator to form the alternating layered structure. In a further embodiment, the separators can be oversized with respect to the length of the cell stack. Separator sheets can be stacked in sandwich arrangement with the anode in the middle. The excess separator is folded upwards and taped to isolate the bottom of the anode to contain zinc dendrites inside the fold. The cathode sheet can then be placed on the top. The separator-anode-separator-cathode stack can then be wound around a mandrel to form the jellyroll.

Figure 5A:
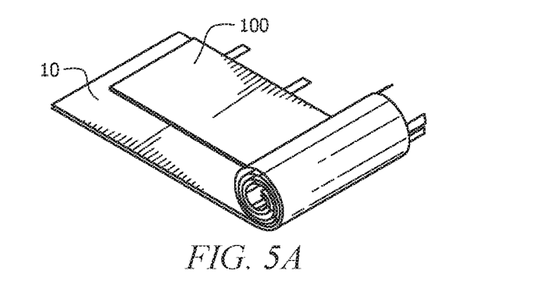
FIG. 5a-5b disclose additional embodiments of the separator structure used in the secondary cell.
Figure 5B:
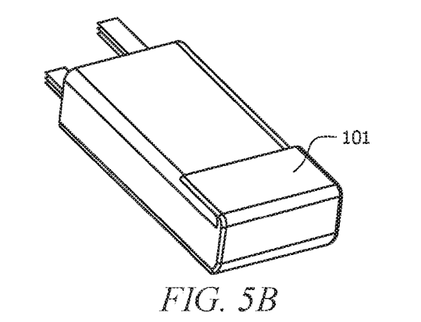

With reference to FIG. 5a, in a further embodiment, the separator-cathode-separator-anode stack is first wound around a mandrel to form the Jellyroll. In FIG. 5b the excess separator 101 can be folded upwards and taped to isolate the bottom of the cathode from zinc dendrites. In a further embodiment, the separator-anode-separator-cathode stack is first wound around a mandrel to form the Jellyroll. Then the excess separator is folded upwards and taped to contain the bottom of the anode including any zinc dendrites. When placed within a housing, the folded separator can be maintained in position even if the tape or other adhesive fails over time. Further, compression of the jelly role within a housing may help to avoid any unwinding of the jelly role as well as maintaining pressure on the separator layers to form a seal.

Figure 6A:
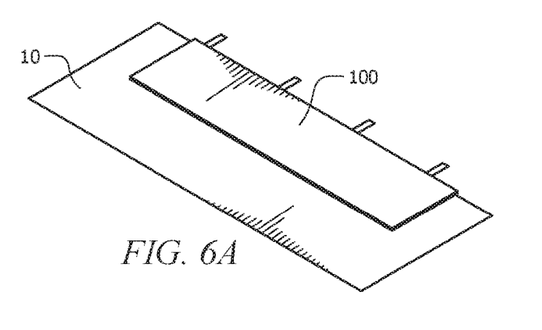
FIG. 6a-6b disclose additional embodiments of the separator structure used in the secondary cell.
Figure 6B:
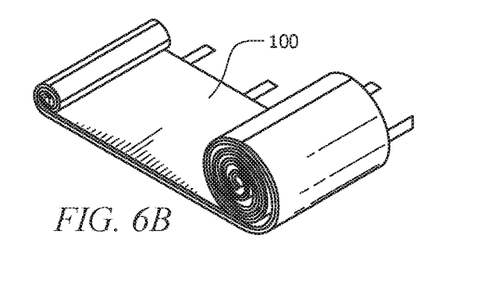

With reference to FIGS. 6a and 6b, in a further embodiment, the cathode 10 is placed in a "U" shaped fold of the separators 100. At least 1 layer of separator must form the "U" shape. The remaining layers of separator may be in sheets. There can be between 1-10 inches, or between about 2-5 inches of extra separator at the beginning and end of the electrode stack. In FIG. 6b, the excess separator is rolled into a role (e.g., a cinnamon bun like configuration). The rolled separator can then form the mandrel for initiating the jellyroll of the electrode stack. The rolls, at the beginning and end of the jellyroll, provide a tortuous path for any zinc dendrites that may form along the edges of the electrode. The cathode bottom of the jellyroll is protected by the "U" of the separator, and the cathode top of the jellyroll is protected by at least about 0.25 or at least about 0.5 inch of separator, protruding from the top of the jellyroll.

In use, the resulting cell can have an electrolyte present. The electrolyte can serve as an ion transporter such as an aqueous battery electrolyte or an aqueous electrolyte. In an embodiment, the electrolyte can comprises any suitable aqueous electrolyte comprising ionic conductivity and with a pH value between 1 and 14. In an embodiment, the electrolyte has a pH value of about 14, alternatively less than about 14, alternatively less than about 13, or alternatively less than about 12. In the case of rechargeable batteries, the electrolyte is important both for the active/discharging cycle of the battery (while the battery supplies a current) and for the recharging cycle when Zn may be electrodeposited to replenish the anode material.

In an embodiment, the electrolyte comprises a hydroxide such as potassium hydroxide, sodium hydroxide, lithium hydroxide, cesium hydroxide, or any combination thereof, in a concentration of from about 1 wt. % to about 50 wt. %, alternatively from about 10 wt. % to about 40 wt. %, or alternatively from about 25 wt. % to about 35 wt. %, based on the total weight of the electrolyte solution. In an embodiment, the electrolyte comprises potassium hydroxide in a concentration of about 30 wt. %, based on the total weight of the electrolyte within the cell.

Figure 7:
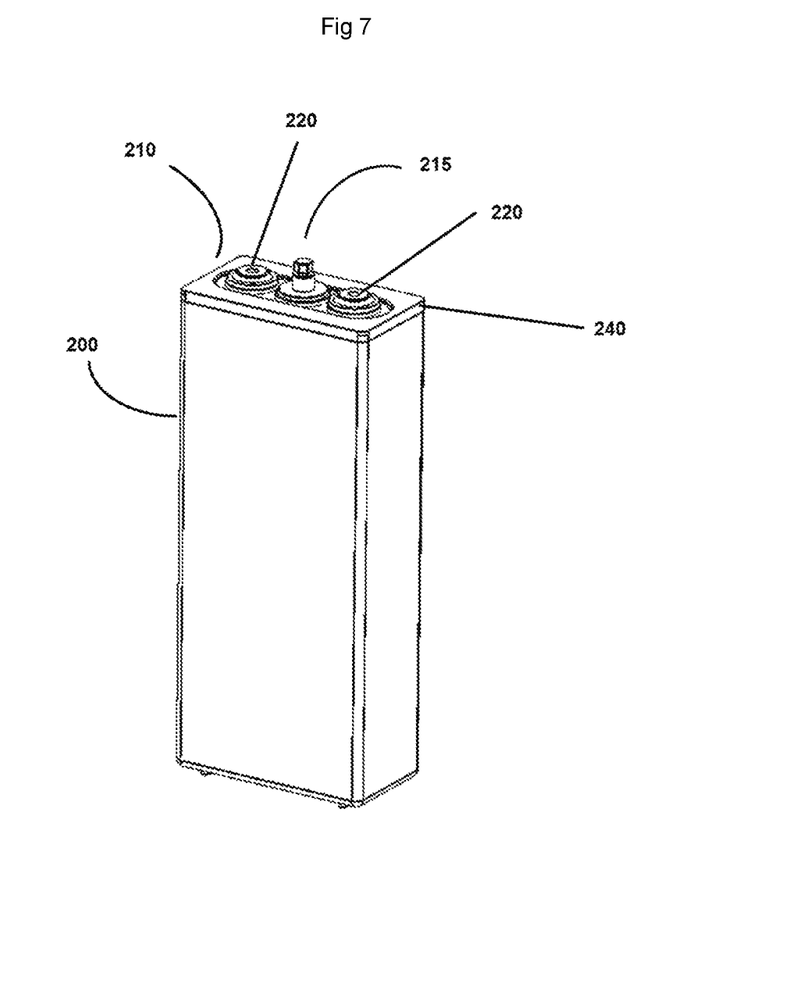
FIG. 7 is a representation of the external appearance of the cell box and top according to an embodiment.
Figure 8:
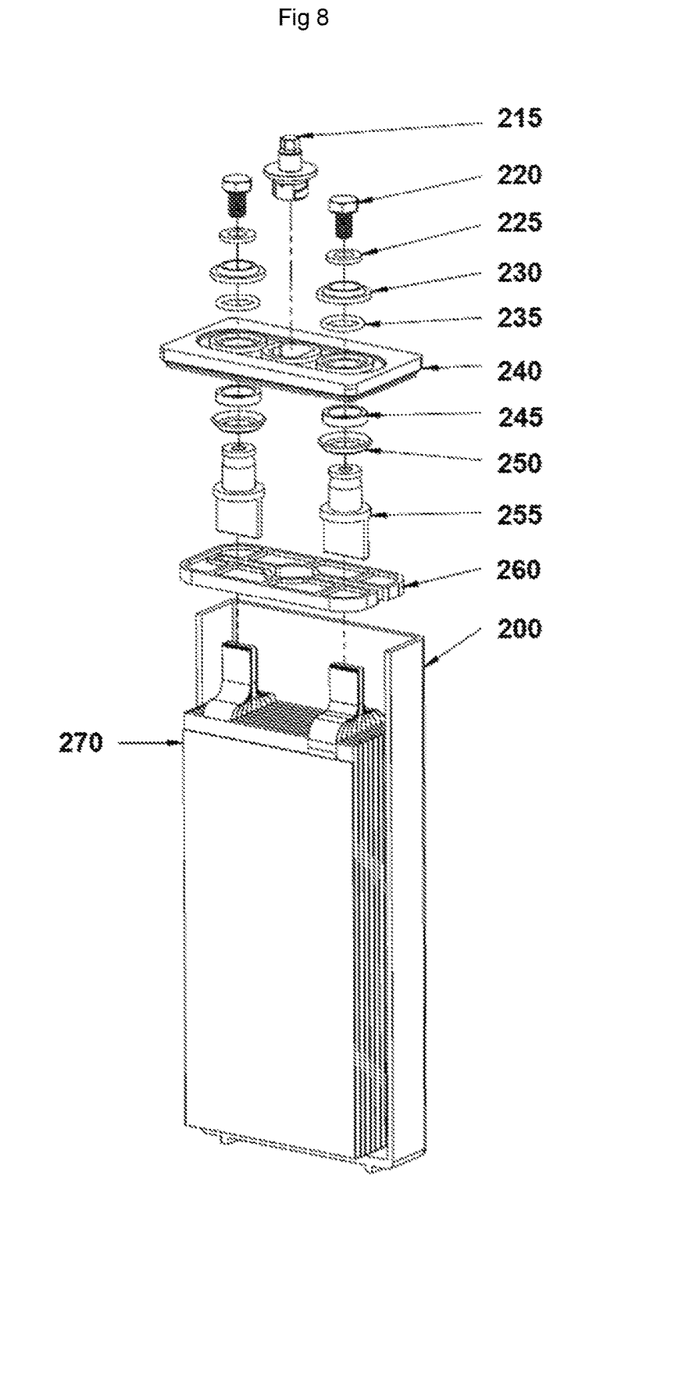
FIG. 8 is an expanded representation of a cell top according to an embodiment.

With reference to FIG. 7: each cell, whether in prismatic or jelly roll form, can be housed in a box 200 constructed from, but not limited to, polypropylene or nickel-coated, cold-rolled steel. At the top of the box are the external faces of the vent cap 215, two screws 220 and the lid 240. With reference to FIG. 8, the cross sectional view of the cell stack 270 in prismatic form is shown and an expanded view of the top of the cell illustrates a vent cap 215, screws 220, washers 225, lock washers 230, sealing O-rings 235, the lid 240, gaskets 245, gasket cups 250, terminal bolts 255, and spin stop 260. The lid 240 may be constructed from, but not limited to, polypropylene or nickel-coated, cold-rolled steel or mixture thereof. The vent cap 215 allows safe-venting of any gasses generated during the operation of a cell. Venting can occur between 2 and 5 psi of pressure inside the cell. The vent caps can be made of, but are not limited to, nylon 6, nylon 66, polypropylene, or nickel-coated, cold-rolled steel. The terminal bolts 255 are located on opposite sides of the top of each cell. The terminal bolts can be made of, but are not limited to, nickel-coated, cold-rolled steel. The lock washers 230, located on each terminal bolt, outside the cell, secure the seal provided by the sealing O-rings 235 underneath. The lock washers 230 are color-coated (e.g., red and blue) for easy visual assembly, and can be made of, but are not limited to, nylon 6, nylon 66, or polypropylene. The gasket cups 250 are located on each terminal bolt 255 inside the cell and are similar to the lock washers 230 used to secure the seal provide by gaskets above. The sealing O-rings 235 and gaskets 245 are located under the lock washers 230 and gasket cups 250, respectively, and can be made of, but are not limited to EPDM, ethylene propylene diene monomer. The gaskets 245 and sealing O-rings 235 provide a hermetic seal which prevents moisture and air from entering or leaving the cell. The spin-stop 260 serves to maintain a stationary orientation of the terminal bolts while connecting multiple cells, and are made of, but not limited to, polypropylene, nylon 6, nylon 66, or nickel-coated, cold-rolled steel. Two screws 220, which drill into each terminal bolt, can be used to connect multiple cells, and are made of, but not limited to, stainless steel or cold-rolled steel.

It is contemplated that the above features can be applicable where the cell stack 270 is in prismatic or jelly roll forms.

Examplary Cathode Formulation(S)

The manganese dioxide cathode consists of electrolytic manganese dioxide powder (e.g., having a particle size between about 25 to about 55 microns) composite embedded into a conductive current collector where the current collector can be, though not limited to, screen, mesh, perforated and/or electroformed foil, and/or a metal foam. Screen and mesh manufacturers include, but are not limited to, Dexmet and Gerard Daniel. The collector can be metallic, such as but not limited to nickel, nickel-coated cold rolled steel, or a composite material where the outer layer is, though not limited to, nickel, and the inner composite material is a nonconductive material, such as, though not limited to, nylon, polyethylene and polypropylene.

The dry composite cathode can consists of, or consist essentially of, 75% to 85% electrolytic manganese dioxide (EMD) powder, such as though not limited to the battery grade EMD supplied by Tronox or Erachem; 4%-7% binder, which can be, though is not limited to, PTFE, such as DuPont Dispersion 30, polyvinyl alcohol, such as Sekisui 205 and 530 grade Selvol, carboxymethoxy cellulose, such as Ashland Chemical Aqualon 7MF, hydroxymethoxy cellulose, polyethylene oxide, such as Dow Polyox WSR305, polyacrylic acid, such as Lubrizol Noverite K702, polysaccharide gum, such as guar gum, xanthan gum and chitin; and a 10% to 20% carbon(s) blend comprising a plurality of carbon compositions. The carbon(s) blend consists of graphite blended with a conductive carbon additive, which can include, but is not limited to, expanded graphite, carbon black, and/or carbon nanotubes (e.g., single walled carbon nanotubes, multi-walled carbon nanotubes, functionalized carbon nanotubes, and the like). The graphite to carbon additive ratio can range from 7:1 to 28:1. The carbons are available from sources including Imersys, Superior Graphite, or Cabot. Performance additives, such as magnesium oxide, titanium dioxide, calcium titanate, barium titanate, barium hydroxide, bismuth oxide, and titanium boride may be included with the total content less than or equal to about 1%. Thus, the cathode composition can consist of the manganese dioxide, the binder, and the carbon blend, with only a minor amount of other compositions present in an amount of less than about 2% or less than about 1% by weight. Performance additives are available through sources such as Fisher Scientific and Sigma Aldrich.

The cathode components are mixed with a solvent, such as but not limited to water, where the solvent content of the mix is between 10% and 45%. The cathode mix can be a moist paste with a viscosity greater than 500,000 cp that can be, but is not limited to, paste coated onto the current collector. The coated electrodes can then be dried to a moisture content of less than 12% moisture prior to use.

In an embodiment, the cathode composite is composed of 5 ingredients: Electrolytic Manganese Dioxide, Polytetrafluoroethylene, Graphite, Expanded Graphite (or Carbon Black), and Additives. An example formulation may be, but is not limited to, about 77% by mass Electrolytic Manganese Dioxide, about 18.5% by mass carbon blend, about 0.5% by mass additive(s) package, and about 4% by mass Polytetrafluoroethylene. An example carbon blend may be, but is not limited to, (out of the 18.5% by mass carbon blend) about 0.5% by mass carbon nanotubes, about 1% by mass expanded graphite, and about 17% by mass graphite. An example additive(s) package may be, but is not limited to, about 0.25% by mass Barium Titanate (BaTiO3) and about 0.6% by mass magnesium oxide (MgO).

In an embodiment, the first step in cathode paste preparation is to blend the graphite and conductive carbon additive to form a ratio of, but not limited to, between about 11:1 and about 12:1, or about 11.33:1. Carbon blending may be accomplished, but not limited to, in a V-type blender for between about 10 minute and an hour, for example, about 40 mins. The EMD, carbon blend, and water can then be mixed in a planetary blender for about 3 mins. Lastly, the cathode paste can be prepared by mixing the wet EMD and carbon blend with the binder in the planetary blender for an additional 3 mins.

The resulting cathode paste may be granulated using a simple extrusion granulator and roll coated on the current collector (e.g., a nickel current collector) with a metering gap of about 0.075 inches and an embed gap of about 0.135 inches.

Examplary Anode Formulation(s)

The zinc anode consists of a zinc powder composite embedded into a conductive current collector where the current collector can be, though not limited to screen, mesh, perforated and/or electroformed foil, and foam. Screen and mesh manufacturers include but not limited to Dexmet and Gerard Daniel. The collector can be metallic, such as but not limited to copper, brass and tin or a composite material where the outer layer is, though not limited to, copper, tin, indium and white bronze coating on a conductive material, such as though not limited to steel, or a nonconductive material, such though not limited to nylon, polyethylene and polypropylene.

The dry composite anode consists of 85% to 98% battery grade zinc alloy powder, such as though not limited to the battery grade zinc powder manufactured by UMICORE and by Grillo, where the alloying elements can be but not limited to indium, aluminum, bismuth, calcium, lead and mercury; 1%-7% binder, which can be, though is not limited to, PTFE, such as DuPont Dispersion 30, polyvinyl alcohol, such as Sekisui 205 and 530 grade Selvol, carboxymethoxy cellulose, such as Ashland Chemical Aqualon 7MF, hydroxymethoxy cellulose, PVDF, polyethylene oxide, such as Dow Polyox WSR305, polyacrylic acid, such as Lubrizol Noverite K702, polysaccharide gum, such as guar gum, xanthan gum and chitin; 0% to 10% zinc oxide, such as but not limited to USZinc AZO 77USP; 0%-5% gelling additives, such as but limited to Lubrizol Carbopol 740 and Carbopol 741 and SNF Flocare 290, 0%-5% fibrous additives, such as but not limited to Lenzing Tencil and Sappi fibers; 0%-2% additives, such as but not limited to indium hydroxide, calcium zincate, bismuth oxide, clay, such as BYK Laponite JS, and carbon black, such as TIMCAL Super P; and 0%-1% organic surfactant, such as but not limited to as polyethylene glycol (Carbowax), polyethylene glycol ethers (Triton and Brij), phosphate compound (Rhodafac RM510) and/or amphormetric (Witconate 1840X).

The anode components can be mixed with solvent, such as but not limited to, water and isopropanol, where the solvent content of the mix is between 10% to 45%. Depending on the binder selection, the anode mix be a moist powder that can be, though not limited to, paste coated onto the collector or a gel that can be though not limited to extruded, tape cast or slot die coated onto the collector or onto a carrier and then transferred to the collector. After casting, the coated electrodes is then dried before use.

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner.

Example 1

A gel anode mix consisting of 49.6% Bismuth Indium (100/200) alloyed battery grade zinc (Umicore), 4.1% PTFE Dispersion 30 (DuPont), 0.4% polyvinyl alcohol, MW 20,000 (Acros), 0.4% polyvinyl alcohol, MW 90,000 (Acros), 0.8% Aqualon 7MF carboxymethoxy cellulose (Ashland Chemical), 0.5% carbomer Carbopol 941 (Lubrizol) with the balance water was prepared.

The anode gel was prepared by first mixing the PTFE dispersion with the dry zinc powder at the lowest speed in a planetary blend for 1 minute. Then, the gelled polymer mix, which was a homogeneous pregel consisting of the water, polyvinyl alcohol, carboxymethoxy cellulose, and carbomer that had a viscosity of 4000 cp, was added to the zinc—PTFE mixture in the planetary blender and mixed for 2 min.

The resulting mix was cast using a Gardco doctor's blade with a 0.89 mm gap onto a copper screen (Dexmet).

Example 2

A gel anode mix consisting of 78.8% Bismuth Indium (100/200) alloyed battery grade zinc (Umicore), 0.2% polyvinyl alcohol, MW 20,000 (Acros), 0.2% polyvinyl alcohol, MW 90,000 (Acros), 0.3% Aqualon 7MF carboxymethoxy cellulose (Ashland Chemical), 0.3% carbomer Carbopol 941 (Lubrizol), 0.3% 0.7 dtex Tencel fibers (Lenzing), 0.1% 2.0 dtex Tencel fibers (Lenzing), 0.4% Laponite XLS clay (BYK), 0.03% indium hydroxide (Alfa Aesar), 0.003 Polyethylene Glycol 600 (Dow) with the balance water was prepared.

The anode gel was prepared by first mixing the dry zinc powder with indium hydroxide and laponite in the planetary blender at low speed for 1 min. A solution containing the polyethylene glycol 600 with 2% of the total water was then added to the dry mix and mixed again at low speed for 1 min. Finally, the polymeric gel, which had a viscosity of 53,000 cp, that contains the polyvinyl alcohol, carboxymethoxy cellulose, carbomer, and Tencel fibers and the balance of the water was added to the zinc mix and mixed at the lowest speed in the planetary blend for 2 minute.

The resulting mix was cast using a Gardco doctor's blade with a 0.89 mm gap onto a copper screen (Dexmet).

Example 3

A paste anode mix consisting of 82.9% Bismuth Indium (100/200) alloyed battery grade zinc (Umicore), 5.1% PTFE Dispersion 30 (DuPont), 0.7% Laponite XLS clay (BYK), 0.1% Carbopol 941 (Lubrizol), 0.05% 0.7 dtex Tencel fibers (Lenzing), 0.03% indium hydroxide (Alfa Aesar), 0.003% Polyethylene Glycol 600 (Dow), and balance water was prepared.

The anode paste was prepared by first mixing the dry zinc powder with indium hydroxide in a Turbula blender for 15 minutes. The zinc/indium hydroxide blend was transferred to a double planetary mixer. Two mixes were added to the dry zinc/indium hydroxide blend. One contained the Laponite XLS, the Tencel fibers, and approximately 55% of the total water in the wet anode paste. The second contained the Carbopol 941, polyethylene glycol 600, and 45% of the total water in the wet anode paste. The components were blended in the double planetary mixer for 1 minute. Following this mix step, the PTFE Dispersion 30 was added to the double planetary mixer, and the components were blended for 1 minute.

The resultant anode paste was then removed from the double planetary mixer. The paste was granular at this point, with granule characteristic dimension ranging in size from 500 μm to 1 cm. The granular paste was passed through a number 16 brass mesh sieve. Granules that pass through the mesh sieve were fed into the hopper of a three-roll coater, and pasted onto a copper screen (Dexmet).

Having described various devices and processes herein, some embodiments can include, but are not limited to, In a first embodiment, an electrochemical cell comprises: an anode; and a cathode, wherein the cathode comprises a paste, where the paste comprises manganese dioxide.

A second embodiment can include the electrochemical cell of the first embodiment, wherein the paste is formed as a prismatic sheet or jelly roll.

A third embodiment can include the electrochemical cell of the first or second embodiment wherein the paste comprises between about 75% and about 85% manganese dioxide by weight.

A fourth embodiment can include the electrochemical cell of any one of the preceding embodiments, wherein the paste further comprises carbon.

A fifth embodiment can include the electrochemical cell of any one of the preceding embodiments, wherein the paste further comprises a blend of a plurality of carbons.

A sixth embodiment can include the electrochemical cell of the fourth or fifth embodiment, wherein the carbon comprises at least one of graphite, expanded graphite, non-expanded graphite, carbon black, carbon nanotubes, or carbon nanofibers.

A seventh embodiment can include the electrochemical cell of any one of the fourth to sixth embodiments, wherein the carbon comprises particles in the range of from about 20 to about 30 microns.

An eighth embodiment can include the electrochemical cell of any one of the preceding embodiments, wherein the paste further comprises a conductive additive.

A ninth embodiment can include the electrochemical cell of the eighth embodiment, wherein the conductive additive comprises particles having a size in the range of from about 5 to about 15 microns.

A tenth embodiment can include the electrochemical cell of any one of the preceding embodiments, wherein the manganese dioxide comprises particles having a size in the range of from about 45 to about 55 microns.

An eleventh embodiment can include the electrochemical cell of any one of the preceding embodiments, wherein the paste comprises graphite and a conductive additive, wherein a ratio of the graphite to the conductive additive is in a range of from about 7:1 to about 28:1

A twelfth embodiment can include the electrochemical cell of any one of the preceding embodiments, wherein the paste comprises one or more carbon compounds present between about 10% and about 20% by weight of the paste.

A thirteenth embodiment can include the electrochemical cell of any one of the preceding embodiments, wherein the paste further comprises a binder.

A fourteenth embodiment can include the electrochemical cell of the thirteenth embodiment, wherein the binder comprises at least one of polytetrafluoroethylene (PTFE), polyethylene, carboxymethyl cellulose, polyvinyl alcohol, or latex.

A fifteenth embodiment can include the electrochemical cell of the thirteenth or fourteenth embodiment, wherein the paste comprises between about 4% and about 7% by weight of the binder.

A sixteenth embodiment can include the electrochemical cell of any one of the preceding embodiments, wherein the paste further comprises an additive.

A seventeenth embodiment can include the electrochemical cell of the sixteenth embodiment, wherein the additive comprises at least one of MgO, $BaTiO_3$, $CaTiO_3$, BaOH, $Bi_2O_3$, $TiO_2$, or $TiB_2$.

An eighteenth embodiment can include the electrochemical cell of the sixteenth or seventeenth embodiment, wherein the paste comprises between less than or equal to about 1% by weight of the additive.

A nineteenth embodiment can include the electrochemical cell of any one of the preceding embodiments, wherein the paste is a self-supporting paste.

A twentieth embodiment can include the electrochemical cell of any one of the preceding embodiments, wherein the paste has a porosity in the range of from about 25% to about 35%.

A twenty first embodiment can include the electrochemical cell of any one of the preceding embodiments, wherein the paste has a density of from about 1.5 g/cm3 to about 2.5 g/cm3.

A twenty second embodiment can include the electrochemical cell of any one of the preceding embodiments, wherein the electrochemical cell has a volumetric energy density of at least about 40 Wh/L per cycle.

In a twenty third embodiment, an electrochemical cell comprises: a cathode; and an anode, wherein the anode comprises a gel comprising zinc.

A twenty fourth embodiment can include the electrochemical cell of the twenty third embodiment, wherein the gel comprises a zinc content of 75% or greater by weight of the gel.

A twenty fifth embodiment can include the electrochemical cell of the twenty third or twenty fourth embodiment, wherein the gel comprises water.

A twenty sixth embodiment can include the electrochemical cell of the twenty sixth embodiment, wherein the gel comprises between about 10% and about 40% water.

A twenty seventh embodiment can include the electrochemical cell of any of the twenty third to twenty sixth embodiments, wherein the gel further comprises at least one binder.

A twenty eighth embodiment can include the electrochemical cell of the twenty seventh embodiment, wherein the binder comprises a homopolymer.

A twenty ninth embodiment can include the electrochemical cell of the twenty eighth embodiment, wherein the homopolymer comprises polytetrafluoroethene, carboxymethyl cellulose, polyvinylalcohol, Carbapol®, polyethylene glycol, or any combination thereof.

A thirtieth embodiment can include the electrochemical cell of any of the twenty third to twenty ninth embodiments, wherein the gel further comprises an additive comprising at least one of zinc oxide, carbon powder, indium compounds, bismuth compounds, lithiated and fibrous compounds, or any combination thereof.

A thirty first embodiment can include the electrochemical cell of any one of the preceding embodiments, further comprising a current collector in electrical contact with the cathode, wherein the electrical current collectors comprises at least one of expanded metal, wire screen, perforated metal, or any combination thereof.

A thirty second embodiment can include the electrochemical cell of the thirty first embodiment, wherein the current collector is formed from nickel, nickel plated metal, cold-rolled steel, or any combination thereof.

A thirty third embodiment can include the electrochemical cell of any one of the preceding embodiments, further comprising a separator disposed between the anode and the cathode.

A thirty fourth embodiment can include the electrochemical cell of the thirty fourth embodiment, wherein the separator comprises 1 to 4 layers of cellulose-based sheet, polyethylene-based sheet, polyvinyl alcohol-based sheet, polyvinyl chloride-based sheet, or nonwoven polypropylene sheets, or any combination thereof.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as comprises, includes, and having should be understood to provide support for narrower terms such as consisting of, consisting essentially of, and comprised substantially of. Use of the term "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An electrochemical cell comprising:
a cathode comprising manganese dioxide;
an anode, wherein the cathode and the anode are formed as planar prismatic sheets each having a length and a width, wherein the length is longer than the width; and
a separator disposed between the cathode and the anode, wherein the cathode, the anode, and the separator are disposed in a rolled configuration,
wherein in the rolled configuration the anode, the cathode, and the separator comprise the planar prismatic sheets arranged in a stack with the separator disposed between the cathode and the anode,
wherein the stack comprises the cathode disposed in a fold of the separator,
wherein an edge of the cathode parallel to the length of the cathode is disposed in the fold of the separator,
wherein an end of the separator extends past an end of the cathode in the stack,
wherein the end of the separator forms a rolled core of the rolled configuration,
wherein a rolled core is formed from the end of the separator that extends past the end of the cathode in the stack rolled into a roll,
wherein the rolled configuration comprises the stack spirally rolled about the rolled core,
wherein the cathode and anode having the separator disposed therebetween is rolled around the rolled core in the rolled configuration, and
wherein the separator comprises a plurality of layers, wherein a first layer of the plurality of layers forms the fold, wherein at least a second layer of the plurality of layers forms a planar layer in the stack, wherein a width of the second layer is greater than a width of the cathode.

2. The electrochemical cell of claim 1, wherein in the stack a first portion of the separator extends below a portion of the anode and the cathode, and wherein in the rolled configuration, the first portion of the separator is folded towards the cathode.

3. The electrochemical cell of claim 1, wherein the end of the separator does not contact the anode or the cathode in the stack, and wherein the end of the separator forms a portion of the rolled configuration.

4. The electrochemical cell of claim 1, wherein the cathode, the anode, and the separator are disposed in a cylindrical form in the rolled configuration.

5. The electrochemical cell of claim 1, further comprising a housing, wherein the cathode, the anode, and the separator are disposed within the housing, and wherein external electrical connections are disposed outside of the housing and electrically coupled to the cathode and the anode within the housing.

6. An electrochemical cell comprising:
a cathode comprising manganese dioxide;
an anode; and
a separator disposed between the cathode and the anode, wherein the cathode, the anode, and the separator are disposed in a rolled configuration,
wherein in the rolled configuration the anode, the cathode, and the separator comprise planar sheets arranged in a stack with the separator disposed between the cathode and the anode, wherein an end of the separator extends past an end of the cathode in the stack, wherein a rolled core is formed from the end of the separator that extends past the end of the cathode in the stack rolled into a roll, and wherein the rolled configuration comprises the stack spirally rolled about the rolled core,
wherein the cathode comprises a paste, where the paste comprises the manganese dioxide and a carbon blend, wherein the carbon blend comprises graphite and a carbon based conductive additive,
wherein a ratio of the graphite to the carbon based conductive additive is in a range of from about 7:1 to about 28:1,
wherein at least one of the graphite or the carbon based conductive additive comprises particles in the range of from about 20 microns to about 30 microns, and
wherein the separator comprises a plurality of layers, wherein a first layer of the plurality of layers forms the fold, wherein at least a second layer of the plurality of layers forms a planar layer in the stack, wherein a width of the second layer is greater than a width of the cathode.

7. The electrochemical cell of claim 6, wherein the paste is formed as a prismatic sheet or jelly roll.

8. The electrochemical cell of claim 6, wherein the paste comprises between about 75% and about 85% of the manganese dioxide by weight.

9. The electrochemical cell of claim 6, wherein the carbon based conductive additive comprises at least one of expanded graphite, non-expanded graphite, carbon black, carbon nanotubes, or carbon nanofibers.

10. The electrochemical cell of claim 6, wherein the carbon based conductive additive comprises particles having a size in the range of from about 5 to about 15 microns.

11. The electrochemical cell of claim 6, wherein the manganese dioxide comprises particles having a size in the range of from about 45 microns to about 55 microns.

12. The electrochemical cell of claim 6, wherein carbon blend is present in the paste in an amount between about 10% and about 20% by weight of the paste.

13. The electrochemical cell of claim 6, wherein the paste further comprises a binder.

14. The electrochemical cell of claim 13, wherein the binder comprises at least one of polytetrafluoroethylene (PTFE), polyethylene, carboxymethyl cellulose, polyvinyl alcohol, or latex, and wherein the paste comprises between about 4% and about 7% by weight of the binder.

15. The electrochemical cell of claim 6, wherein the paste further comprises an additive comprising at least one of MgO, $BaTiO_3$, $CaTiO_3$, BaOH, $Bi_2O_3$, $TiO_2$, or $TiB_2$.

16. The electrochemical cell of claim 15, wherein the paste comprises between less than or equal to about 1% by weight of the additive.

17. The electrochemical cell of claim 6, wherein the paste has a porosity in the range of from about 25% to about 35%, and wherein the paste has a density of from about 1.5 $g/cm^3$ to about 2.5 $g/cm^3$.

18. The electrochemical cell of claim 6, wherein the electrochemical cell has a volumetric energy density of at least about 40 Wh/L per cycle.

19. The electrochemical cell of claim 1, wherein the anode comprises a gel comprising zinc, a binder comprising a homopolymer, and water.

20. The electrochemical cell of claim 19, wherein the gel comprises a zinc content of 75% or greater by weight of the gel.

21. The electrochemical cell of claim 19, wherein the gel comprises between about 10% and about 25% water.

22. The electrochemical cell of claim 19, wherein the homopolymer comprises polytetrafluoroethene, carboxymethyl cellulose, polyvinylalcohol, Carbapol®, polyethylene glycol, or any combination thereof.

23. The electrochemical cell of claim 19, wherein the gel further comprises an additive comprising at least one of zinc oxide, carbon powder, indium compounds, bismuth compounds, lithiated and fibrous compounds, or any combination thereof.

24. The electrochemical cell of claim 19, further comprising a current collector in electrical contact with the cathode, wherein the electrical current collectors comprises at least one of expanded metal, wire screen, perforated metal, or any combination thereof.

25. The electrochemical cell of claim 19, wherein the current collector is formed from nickel, nickel plated metal, cold-rolled steel, or any combination thereof.

26. The electrochemical cell of claim 19, further comprising a separator disposed between the anode and the cathode, wherein the separator comprises 1 to 4 layers of cellulose-based sheet, polyethylene-based sheet, polyvinyl alcohol-based sheet, polyvinyl chloride-based sheet, or non-woven polypropylene sheets, or any combination thereof.

* * * * *